United States Patent [19]
Kanda

[11] Patent Number: 4,756,514
[45] Date of Patent: Jul. 12, 1988

[54] FLUID-FILLED RESILIENT BUSHING HAVING EXCELLENT AXIAL VIBRATION DAMPING CHARACTERISTIC

[75] Inventor: Ryouji Kanda, Inuyama, Japan

[73] Assignee: Tokai Rubber Industries, Ltd., Aichi, Japan

[21] Appl. No.: 66,008

[22] Filed: Jun. 24, 1987

[30] Foreign Application Priority Data

Jun. 30, 1986 [JP] Japan .................. 61-100317

[51] Int. Cl.$^4$ ............................................. F16F 5/00
[52] U.S. Cl. .................................... 267/140.1; 248/562
[58] Field of Search ............... 248/562, 609; 267/121, 267/140.1

[56] References Cited

U.S. PATENT DOCUMENTS

| | | | |
|---|---|---|---|
| 3,642,268 | 2/1972 | Hipsher | 267/140.1 X |
| 3,698,703 | 10/1972 | Hipsher | 267/140.1 X |
| 4,693,456 | 9/1987 | Kanda | 267/140.1 |

FOREIGN PATENT DOCUMENTS

| | | | |
|---|---|---|---|
| 0164428 | 9/1984 | Japan | 267/140.1 |
| 0206838 | 9/1986 | Japan | 267/140.1 |

*Primary Examiner*—Duane A. Reger
*Attorney, Agent, or Firm*—Parkhurst & Oliff

[57] ABSTRACT

A fluid-filled resilient bushing including an inner sleeve, an outer sleeve with a plurality of apertures, a sealing sleeve fitted on the outer sleeve, so as to fluid-tightly close the apertures, and an annular resilient member interposed between the inner and outer sleeves so as to resiliently connect the inner and outer sleeves. The resilient member has a plurality of pockets alinged with the apertures. The bushing further includes a plurality of arcuate partition walls disposed in the pockets, respectively, and a plurality of orifice members. Each partition wall is formed as integral parts of the resilient member, so as to divide a radially inner portion of the corresponding pocket into two parts which are spaced apart from each other in an axial direction of the bushing. Each orifice member is fluid-tightly accommodated in a radially outer portion of the corresponding pocket such that the orifice member rests on the corresponding partition wall, so as to fluid-tightly close the two parts and thereby define a pair of fluid chambers which are filled with an incompressible fluid. Each orifice member is held in fluid tight relation with the sealing sleeve, and constitutes at least a part of an orifice through which the two fluid chambers communicate with each other.

12 Claims, 3 Drawing Sheets

FLUID-FILLED RESILIENT BUSHING HAVING EXCELLENT AXIAL VIBRATION DAMPING CHARACTERISTIC

BACKGROUND OF THE INVENTION

1. Field of the Invention

The present invention relates generally to a fluid-filled resilient bushing, and more particularly to a technique for providing the bushing with excellent damping characteristic for axial vibrations, based on a flow resistance of a fluid and inertia of the fluid.

2. Discussion of the Prior Art

A vibration damping support for a vibration system in an automotive vehicle is known as a cylindrical resilient bushing wherein a resilient member is interposed between an inner sleeve and an outer sleeve. One type of such a resilient bushing is adapted primarily for damping and/or isolating vibrations applied thereto in its axial direction. For instance, this type of resilient bushing is utilized as a cross-member mount, a body mount, a tension-rod bushing, a strut mount, and other mounts for resiliently mounting or connecting elements of a vehicle which are subject to vibrations.

The vibration damping mounts or bushings (hereinafter referred to as "resilient bushing") indicated above are generally required to exhibit high damping characteristics for a vibrational load applied thereto in the axial direction. To this end, the conventional resilient bushings employ a rubber block or resilient member which has excellent damping properties. Upon application of an axial vibrational load, the resilient member undergoes elastic deformation, thereby damping the vibration.

In the conventional resilient bushing wherein the resilient member has high damping characteristic due to its elastic deformation, NVH properties (Noise, Vibration and Harshness) of the bushing tend to be deteriorated, since the high damping characteristic of the resilient member necessarily results in a high dynamic spring constant or rate of the resilient member. To avoid excessively high dynamic spring constant, the bushing cannot be provided with sufficiently high damping characteristic.

On the other hand, fluid-filled resilient bushings are proposed as disclosed in U.S. Pat. Nos. 3,642,268 and 3,698,703. These fluid-filled bushings are capable of effectively damping input vibrations based on a flow resistance of a fluid and inertia of the fluid through the bushing, without increasing the dynamic spring constant of the resilient member. However, conventional fluid-filled bushings as disclosed in the above documents are designed to receive vibrations in the radial direction, primarily for damping the radial vibrations. Therefore, these fluid-filled resilient bushings cannot be used for effectively damping vibrations applied in the axial direction.

SUMMARY OF THE INVENTION

It is accordingly an object of the present invention to provide a fluid-filled resilient bushing which is capable of effectively damping axial vibrations based on a flow resistance of a fluid and inertia of the fluid, and which is simple in construction, easy to assemble and accordingly economical to manufacture.

The above object can be achieved according to the present invention, which provides a fluid-filled resilient bushing comprising: (a) an inner sleeve; (b) an outer sleeve disposed in radially outwardly spaced-apart relation with the inner sleeve, and having a plurality of apertures; (c) a sealing sleeve fitted on an outer circumferential surface of the outer sleeve, so as to fluid-tightly close the plurality of apertures; (d) a generally annular resilient member interposed between the inner and outer sleeves so as to resiliently connect the inner and outer sleeves, and having a plurality of pockets aligned with the plurality of apertures; (e) a plurality of arcuate partition walls disposed in the plurality of pockets, respectively, each of the partition walls being formed, as integral parts of the resilient member, so as to divide a radially inner portion of corresponding one of the plurality of pockets into two parts which are spaced apart from each other by each partition wall in an axial direction of the bushing; (f) a plurality of orifice members each of which is fluid-tightly accommodated in a radially outer portion of the corresponding pocket such that each orifice member rests on corresponding one of the plurality of arcuate partition walls, so as to fluid-tightly close the two parts and thereby define a pair of fluid chambers which correspond to the above-indicated two parts and which are filled with an incompressible fluid. Each orifice member is held in fluid tight relation with an inner circumferential surface of the sealing sleeve. The orifice member is adapted to constitute at least a part of orifice means for defining an orifice through which the two fluid chambers communicate with each other.

In the fluid-filled resilient bushing of the present invention constructed as described above, a relatively large vibrational load applied in the axial direction causes an axial relative displacement between the inner sleeve and the sealing sleeve, i.e., between the inner and outer sleeves, which in turn causes elastic deformation of the resilient member interposed between the inner and outer sleeves. As a result, the volume of one of the two fluid chambers formed in each pocket of the rubber block is reduced, while the volume of the other fluid chamber is increased, whereby the pressure in the above one fluid chamber is raised while the pressure in the other fluid chamber is lowered. Consequently, the incompressible fluid is forced to flow through the orifice from the above-indicated one fluid chamber to the other. In this arrangement, the input axial vibrations can be effectively damped based on the flow resistance of the fluid and inertia of the fluid when the fluid is forced to flow through the orifice. Hence, the axial vibrations can be damped in a sufficient degree, without having to use a resilient member which has an excessively high dynamic spring constant.

Further, the instant fluid-filled mount can be readily assembled by simply fitting the sealing sleeve on the outer sleeve after the separately prepared orifice members are set in the respective pockets within a suitable container filled with the incompressible fluid. Stated differently, the orifice communicating with the two fluid chambers in each pocket can be easily formed by the simple assembling procedure wherein the orifice members are merely positioned within the pockets. Thus, the fluid-filled resilient bushing having the above-described functions is considerably simple in construction, extremely easy to assemble, and accordingly economical to manufacture.

According to one feature of the present invention, each orifice member has a recess which is fluid-tightly closed by the inner circumferential surface of the sealing sleeve. In this case, each orifice member may have a pair of communication holes formed therethrough. One of the communication holes communicates with the recess and one of the two fluid chambers, while the other communication hole communicates with the recess and the other communication hole.

According to another feature of the invention, each orifice member has an arcuate positioning groove. The orifice member is set on the corresponding partition wall such that the partition wall is held in fluid tight engagement with the arcuate positioning groove.

According to a further feature of the invention, the bushing further comprises a plurality of arcuate reinforcement plates secured to an outer surface of the plurality of arcuate partition walls. In one form of this feature, each of the plurality of reinforcement plates has end portions embedded within the resilient member.

In accordance with a still further feature of the invention, the resilient member has a plurality of voids formed therethrough so as to extend in the axial direction of the bushing. The voids are spaced apart from each other in a circumferential direction of the bushing, such that each void is positioned between the two adjacent pockets.

According to a yet further feature of the invention, the plurality of the pockets consist of a pair of diametrically opposed pockets, and the corresponding pair of orifice members are accommodated within the respective pockets. In this case, the resilient member may have a pair of diametrically opposed voids formed therethrough so as to extend in the axial direction of the bushing. The voids are opposed to each other in a diametric direction of the resilient member substantially perpendicular to a diametric direction in which the pair of pockets are opposed to each other.

BRIEF DESCRIPTION OF THE DRAWINGS

The above and optional objects, features and advantages of the present invention will be better understood by reading the following detailed description of a preferred embodiment of the invention, when considered in connection with the accompanying drawings, in which.

DETAILED DESCRIPTION OF THE PREFERRED EMBODIMENT

To further illustrate the concept of the present invention, the preferred embodiment of the invention in the form of a cross-member mount for a cross member of a motor vehicle will be described in detail, by reference to the accompanying drawings.

Figure 1:
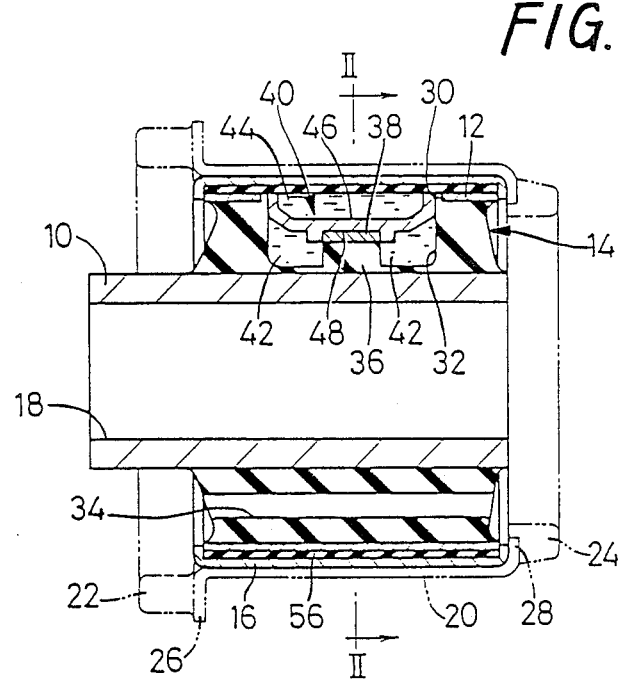
FIG. 1 is an elevational view in axial cross section of one embodiment of a fluid-filled resilient bushing of the present invention in the form of a cross-member mount for an automotive vehicle, taken along line I—I of FIG. 2.
Figure 2:
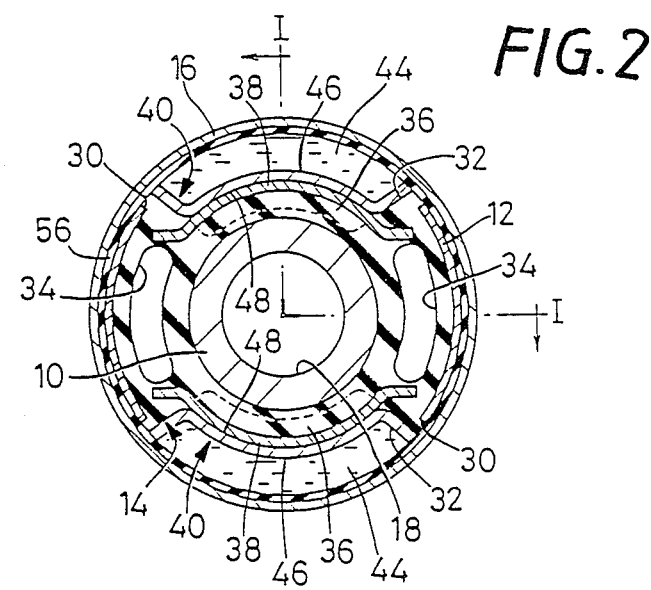
FIG. 2 is an elevational view in transverse cross-section of the cross member mount of FIG. 1, taken along line II—II of FIG. 1.

Referring first to FIGS. 1 and 2, reference numerals 10 and 12 respectively indicate an inner sleeve, and an outer sleeve disposed radially outwardly of the inner sleeve. These inner and outer sleeves 10, 12, which are made of a metallic material, are concentric with each other. One axial end of the inner sleeve 10 axially protrudes a suitable distance from the corresponding axial end of the outer sleeve 12. Between the inner and outer sleeves 10, 12, there is formed a resilient member in the form of a generally rubber block 14 so that the inner and outer sleeves 10, 12 are elastically or resiliently connected to each other. A sealing sleeve 16, also made of a metallic material, is fluid-tightly fitted on the outer circumferential surface of the outer sleeve 12. The present cross-member mount is installed in place such that a suitable mounting rod is inserted through a bore 18 formed in the inner sleeve 10, while a suitable cylindrical fitting is fitted either directly on the sealing sleeve 16, or via a mounting sleeve 20 as indicated in FIG. 1. The cylindrical fitting is fixed to the cross member of the vehicle, while the mounting rod is fixed to the body of the vehicle, whereby the cross member and the body are resiliently connected by the present fluid-filled resilient cross-member mount.

The rubber block 14 is secured to the inner and outer sleeves 10, 12 by vulcanization. Reference numerals 22, 24 appearing in FIG. 1 designate two rubber rings which are secured by vulcanization to outer and inner flanges 26, 28 which extend radially outwardly and inwardly from the opposite axial ends of the mounting sleeve 20.

Figure 3:
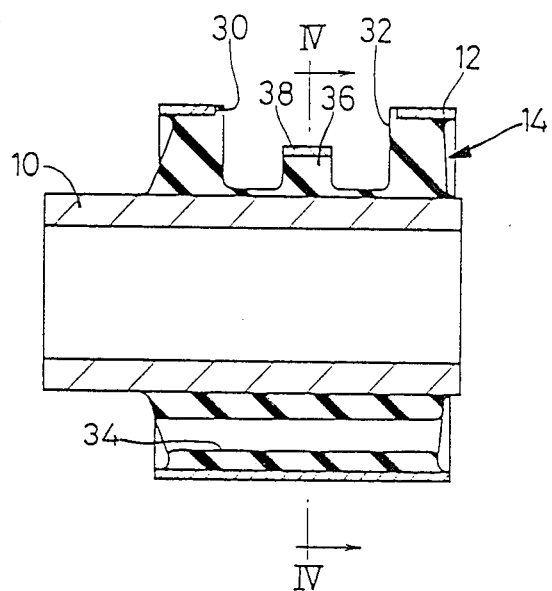
FIG. 3 is a cross sectional view corresponding to that of FIG. 1, taken along line III—III of FIG. 4, showing a sub-assembly of the cross-member mount including a rubber block secured by vulcanization to inner and outer sleeves.
Figure 4:
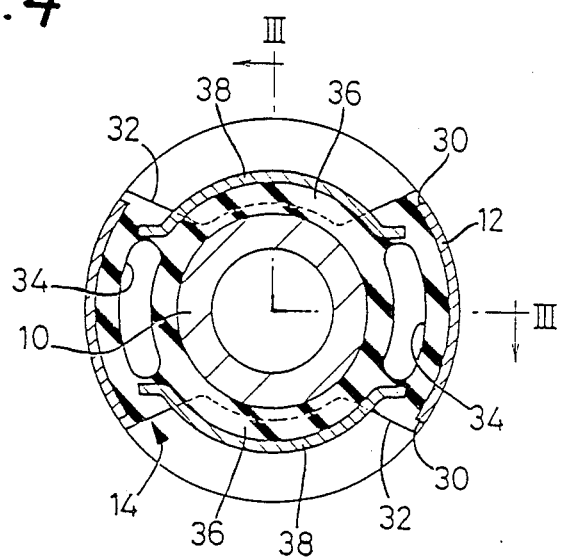
FIG. 4 is a cross sectional view of the sub-assembly of FIG. 3, taken along IV—IV of FIG. 3.

Referring further to FIGS. 3 and 4, the outer sleeve 12 has a pair of diametrically opposed apertures 30, 30, which have a generally rectangular shape as viewed in the radial direction of the mount (bushing). The rubber block 14 has a pair of diametrically opposed pockets 32, 32 whose openings are aligned with the apertures 30, 30, respectively. The rubber block 14 further has a pair of diametrically opposed arcuate voids 34, 34 formed therethrough in the axial direction. As shown in FIG. 4, these arcuate voids 34, 34 are located between the two pockets 32, 32 as viewed in the circumferential direction of the outer sleeve 12. Namely, the direction of arrangement of the two voids 34, 34 is perpendicular to the direction of arrangement of the two pockets 32, 32.

As shown in FIGS. 3 and 4, each pocket 32 is defined by a pair of axially opposed surfaces of the rubber block 14 which are substantially perpendicular to the axial direction of the mount (bushing), and a pair of circumferentially opposed surfaces which are parallel to the axial direction of the mount. The circumferentially opposed surfaces are inclined at a suitable angle with respect to the radial direction of the mount, inwardly of a sector whose arc is defined by the arcuate periphery of the pocket 32, as indicated in FIG. 4. The rubber block 14 has a pair of diametrically opposed arcuate partition walls 36, 36 formed within the respective pockets 32, 32. Each partition wall 36 has an outside diameter smaller than the depth of the pockets 32, 32, and is positioned in the middle of the corresponding pocket 32 in the axial direction of the inner sleeve 10, so that the partition wall 36 divides a radially inner portion of the pocket 32 into two equal parts which are spaced apart from each other in the axial direction, as indicated in FIG. 3. The outer circumferential surfaces of these arcuate partition walls 36, 36 are covered by a corresponding pair of arcuate reinforcement plates 38, 38 secured by vulcanization to the rubber block 14, such that the end portions (as seen in the circumferential direction of the inner sleeve 10) of the partition walls 36, 36 are embedded within the rubber block 14, as shown in FIG. 4. The embedded end portions of the reinforcement plates 38, 38 are bent at their extreme ends toward the outer sleeve 12 in the direction perpendicular to the direction in which the plates 38, 38 are disposed opposite to each other in the diametric direction of the mount, as shown in FIG. 4. This figure also shows that the arcuate voids 34, 34 are formed such that their ends are located adjacent to the embedded ends of the reinforcement plates 38, 38.

Figure 5:
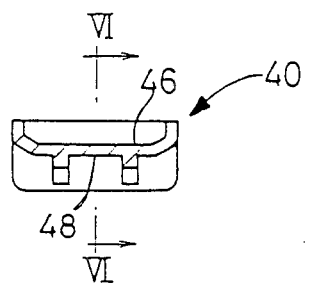
FIG. 5 is a cross sectional view corresponding to that of FIG. 1, showing an orifice member incorporated in the cross-member mount of FIG. 1.
Figure 6:
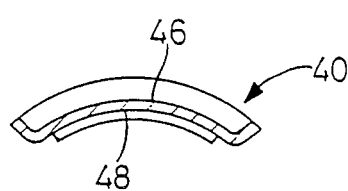
FIG. 6 is a cross sectional view taken along line VI—VI of FIG. 5.
Figure 7:
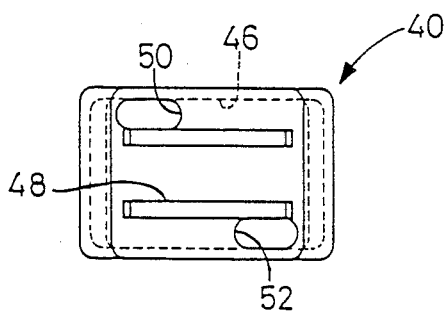
FIG. 7 is a bottom plan view of the orifice member of FIGS. 5 and 6.

As shown in FIG. 1, each of the pockets 32, 32 accommodates therein an orifice member 40 constructed as shown in FIGS. 5 through 7. The orifice member 40 has an arcuate shape as shown in FIG. 6, and is adapted to fluid-tightly close the above-indicated two equal parts of the radially inner portion of the pocket 32 which are separated from each other by the corresponding arcuate partition wall 38. Thus, a pair of arcuate fluid chambers 42, 42 are formed in each pocket 32, by the rubber block 14 and the orifice member 40. These fluid chambers 42, 42 are therefore separated from each other in the axial direction of the present mount or fluid-filled bushing. With the metallic sealing sleeve 16 fitted on the outer surface of the outer sleeve 12, the orifice members 40, 40 are held in abutting contact with the inner circumferential surface of the sealing sleeve 16, as indicated in FIGS. 1 and 2. As described later in detail, orifices 44, 44 are formed between the sealing sleeve 16 and the orifice members 40, 40, so that the two fluid chambers 42, 42 in each pocket 32 are held in communication with each other through the corresponding orifice 40.

Assembling operations to set the orifice members 40, 40 in the pockets 32, 32 and fit the sealing sleeve 16 on the outer sleeve 12 are conducted within a mass of a suitable incompressible fluid such as water, alkylene glycols, polyalkylene glycols, silicone oils, low molecular weight polymers, or a mixture thereof. Thus, the fluid chambers 42, 42 and the orifice 44 in each pocket 32 are filled with the incompressible fluid.

As shown in FIGS. 1, 2, and FIGS. 5 through 7, each orifice member 40 is a generally cup-shaped member whose outer surface defines an arcuate recess 46, and which has a rectangular shape as seen in the plan view of FIG. 5. The orifice member 40 has the same outer dimension as the opening of the pocket 32, and is provided with an arcuate positioning groove 48 formed in the inner surface opposite to the recess 46. As indicated in FIGS. 1 and 2, the orifice member 40 is positioned in a radially outer portion of the pocket 32, such that the axially opposed surfaces defining the recess 46 are held in pressed contact with the axially opposed surfaces of the rubber block 14 which define the pocket 32. Further, the orifice member 40 rests on the reinforcement plate 38 on the partition wall 36, such that the arcuate positioning groove 48 fluid-tightly engages the reinforcement plate 38. Thus, the pair of fluid chambers 42, 42 is formed.

As depicted in FIG. 7, the orifice member 40 has a pair of communication holes 50, 52 formed therethrough. The communication hole 50 communicates with the recess 46 and one of the two fluid chambers 42, 42, while the other hole 52 communicates with the recess 46 and the other fluid chamber 42. Namely, these two holes 50, 52 are formed on the opposite sides of the positioning groove 48, respectively, such that the holes 50, 52 are located on a diagonal line of the rectangular shape of the recess 46 as seen in the plan view of FIG. 7. Thus, the recess 46 is fluid-tightly closed by the sealing sleeve 16 is held in communication with the two fluid chambers 42, 42 through the respective communication holes 50, 52. In other words, the two fluid chambers 42, 42 communicate with each other through the orifice 40 which consists of the recess 46 closed by the sealing sleeve 16, and the two communication holes 50, 52 in the orifice member 40.

Figure 8:
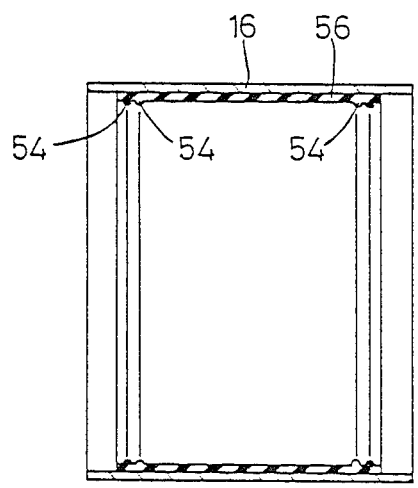
FIG. 8 is an elevational view in transverse cross section of a sealing sleeve before it is fitted on the outer sleeve of the cross-member mount of FIG. 1.

Before the sealing sleeve 16 is fitted on the outer sleeve 12, this outer sleeve is subjected to a suitable drawing operation to compress the rubber block 14 in the radially inward direction, for giving the rubber block 14 a suitable amount of radial pre-compression. The drawing operation is achieved by using dies disposed around the outer sleeve 12. After the sealing sleeve 16 is fitted on the outer sleeve 12, the sealing sleeve 16 is roll-caulked at their opposite axial ends against the corresponding ends of the outer sleeve 12. As shown in FIG. 8, the inner surface of the metallic sealing sleeve 16 is coated with a sealing rubber layer 56 secured thereto by vulcanization. A pair of sealing lips 54, 54 are formed at each end portion of the rubber layer 56. With this rubber layer 56 pressed against the outer surface of the outer sleeve 12, the apertures 30, 30 aligned with the pockets 32, 32 (recesses 46, 46 of the orifice members 40, 40) are fluid-tightly closed.

When a relatively large vibrational load is applied to the thus constructed cross-member mount in the axial direction, the inner sleeve 10 and the sealing sleeve 16, i.e., the inner and outer sleeves 10, 12 are axially displaced relative to each other, causing elastic deformation of the rubber block 14 including the arcuate partition walls 36, 36. As a result, the volume of one of the two fluid chambers 42, 42 in each pocket 32 is reduced while the volume of the other fluid chamber is increased, whereby the pressure in the fluid chamber 42 whose volume is reduced is raised, while the pressure in the other fluid chamber 42 whose volume is increased is lowered. Consequently, the incompressible fluid is forced to flow through the corresponding orifice 44, from the above-indicated one fluid chamber 42 into the other fluid chamber 42. The input vibrations can be effectively damped or attenuated by means of a resistance of the fluid flows through the orifices 44, 44, and inertia of the fluid masses. Therefore, the instant fluid-filled resilient bushing in the form of the cross-member mount can exhibit a sufficiently high degree of damping effect for axial vibrations, without increasing the dynamic spring constant of the rubber block 14.

Further, the instant fluid-filled mount can be readily assembled by simply fitting the sealing sleeve 16 on the outer sleeve 12 after the separately prepared orifice members 40, 40 are set in the respective pockets 32, 32 within the mass of a selected incompressible fluid. Stated differently, the orifices 44, 44 can be easily formed by the simple assembling procedure wherein the orifice members 40, 40 are merely positioned within the pockets 32, 32. Thus, the instant mount is considerably simple in construction, extremely easy to assemble, and accordingly economical to manufacture.

Since the two arcuate voids 34, 34 are disposed in the diametrically opposite portions of the rubber block 14, the instant mount has a significantly reduced dynamic spring constant for radial vibrations applied to the mount in the radial direction parallel to the diametric direction of arrangement of the voids 34, 34, which is perpendicular to the diametric direction of arrangement of the pockets 32, 32.

While the present invention has been described in its preferred embodiment with a certain degree of particularity, it is to be understood that the invention is not limited to the precise detailed of the illustrated embodiment, and that the invention may be otherwise embodied.

In the illustrated embodiment, each orifice 44 for fluid communication between the pair of fluid chambers 42, 42 is defined by the orifice member 40 having the communication holes 50, 52 and the recess 46, and the sealing sleeve 16 closing the recess 46. However, an orifice may be formed through the orifice member 40. Further, the number of the orifices, and their dimensions (length and cross sectional area) may be changed as needed.

While the illustrated embodiment uses the two pockets 32, 32 formed in the diametrically opposite portions of the rubber block 14, three or more pockets may be formed such that they are spaced apart from each other in the circumferential direction of the mount.

Although the illustrated embodiment of the fluid-filled resilient bushing is used as a cross-member mount for a motor vehicle, the bushing of the invention may also be used for other purposes, for example, as a body mount, a tension rod bushing and a strut mount used in the vehicle.

It is further to be understood that the present invention may be embodied with various other changes, modifications and improvements, in connection with the configurations of the individual elements, for example, without departing from the spirit and scope of the invention defined in the appended claims.

What is claimed is:

1. A fluid-filled resilient bushing comprising:
   an inner sleeve;
   an outer sleeve disposed in radially outwardly spaced-apart relation with said inner sleeve, and having a plurality of apertures;
   a sealing sleeve fitted on an outer circumferential surface of said outer sleeve, so as to fluid-tightly close said plurality of apertures;
   a generally annular resilient member interposed between said inner and outer sleeves so as to resiliently connect the inner and outer sleeves, and having a plurality of pockets aligned with said plurality of apertures;
   a plurality of arcuate partition walls disposed in said plurality of pockets, respectively, each of said partition walls being formed, as integral parts of said resilient member, so as to divide a radially inner portion of corresponding one of said plurality of pockets into two parts which are spaced apart from each other by said each partition wall in an axial direction of the bushing;
   a plurality of orifice members each of which is fluid-tightly accommodated in a radially outer portion of the corresponding pocket such that said each orifice member rests on corresponding one of said plurality of arcuate partition walls, so as to fluid-tightly close said two parts and thereby define a pair of fluid chambers which correspond to said two parts and which are filled with an incompressible fluid, said each orifice member being held in fluid tight relation with an inner circumferential surface of said sealing sleeve, and constituting at least a part of orifice means for defining an orifice through which said two fluid chambers communicate with each other.

2. A fluid-filled resilient bushing according to claim 1, wherein said each orifice member has a recess which is fluid-tightly closed by said inner circumferential surface of said sealing sleeve.

3. A fluid-filled resilient bushing according to claim 2, wherein said each orifice member has a pair of communication holes formed therethrough, one of said communication holes communicating with said recess and one of said two fluid chambers, while the other communication hole communicating with said recess and the other fluid chamber.

4. A fluid-filled resilient bushing according to claim 1, wherein said each orifice member has an arcuate positioning groove, said corresponding partition wall fluid-tightly engaging said arcuate positioning groove.

5. A fluid-filled resilient bushing according to claim 1, further comprising a plurality of arcuate reinforcement plates secured to an outer surface of said plurality of arcuate partition walls.

6. A fluid-filled resilient bushing according to claim 5, wherein each of said plurality of reinforcement plates has end portions embedded within said resilient member.

7. A fluid-filled resilient bushing according to claim 1, wherein said resilient member has a plurality of voids formed therethrough so as to extend in the axial direction of the bushing, said voids being spaced apart from each other in a circumferential direction of the bushing, each of said voids being positioned between two adjacent pockets of said plurality of pockets.

8. A fluid-filled resilient bushing comprising:
   an inner sleeve;
   an outer sleeve disposed in radially outwardly spaced-apart relation with said inner sleeve, and having a pair of diametrically opposed apertures;
   a sealing sleeve fitted on an outer circumferential surface of said outer sleeve, so as to fluid-tightly close said pair of apertures;
   a generally annular resilient member interposed between said inner and outer sleeves so as to resiliently connect the inner and outer sleeves, and having a pair of pockets aligned with said pair of apertures;
   a pair of arcuate partition walls disposed in said pair of pockets, respectively, each of said partition walls being formed, as integral parts of said resilient member, so as to divide a radially inner portion of corresponding one of said pair of pockets into two parts which are spaced apart from each other by said each partition wall in an axial direction of the bushing;
   a pair of orifice members each of which is fluid-tightly accommodated in a radially outer portion of the corresponding pocket such that said each orifice member rests on corresponding one of said arcuate partition walls, so as to fluid-tightly close said two parts and thereby define two fluid chambers which correspond to said two parts and which are filled with an incompressible fluid, said each orifice member being held in fluid tight relation with an inner circumferential surface of said sealing sleeve, and constituting at least a part of orifice means for defining an orifice through which said two fluid chambers communicate with each other.

9. A fluid-filled resilient bushing according to claim 8, wherein said resilient member has a pair of diametrically opposed voids formed therethrough so as to extend in the axial direction of the bushing, said voids being opposed to each other in a diametric direction of the resilient member substantially perpendicular to a diametric direction in which said pair of pockets are opposed to each other.

10. A fluid-filled resilient bushing according to claim 8, wherein said each orifice member has a recess which is fluid-tightly closed by said inner circumferential surface of said sealing sleeve.

11. A fluid-filled resilient bushing according to claim 10, wherein said each orifice member has a pair of communication holes formed therethrough, one of said communication holes communicating with said recess and one of said two fluid chambers, while the other communication hole communicating with said recess and the other fluid chamber.

12. A fluid-filled resilient bushing according to claim 8, wherein said each orifice member has an arcuate positioning groove, said corresponding partition wall fluid-tightly engaging said arcuate positioning groove.

* * * * *

UNITED STATES PATENT AND TRADEMARK OFFICE
CERTIFICATE OF CORRECTION

PATENT NO. : 4,756,514

DATED : July 12, 1988

INVENTOR(S) : Ryouji KANDA

It is certified that error appears in the above-identified patent and that said Letters Patent is hereby corrected as shown below:

Title page:

In the Foreign Application Priority Data change "61-100317" to --61-100617--.

Signed and Sealed this

Seventh Day of February, 1989

Attest:

DONALD J. QUIGG

Attesting Officer

Commissioner of Patents and Trademarks